United States Patent Office 3,078,610
Patented Feb. 26, 1963

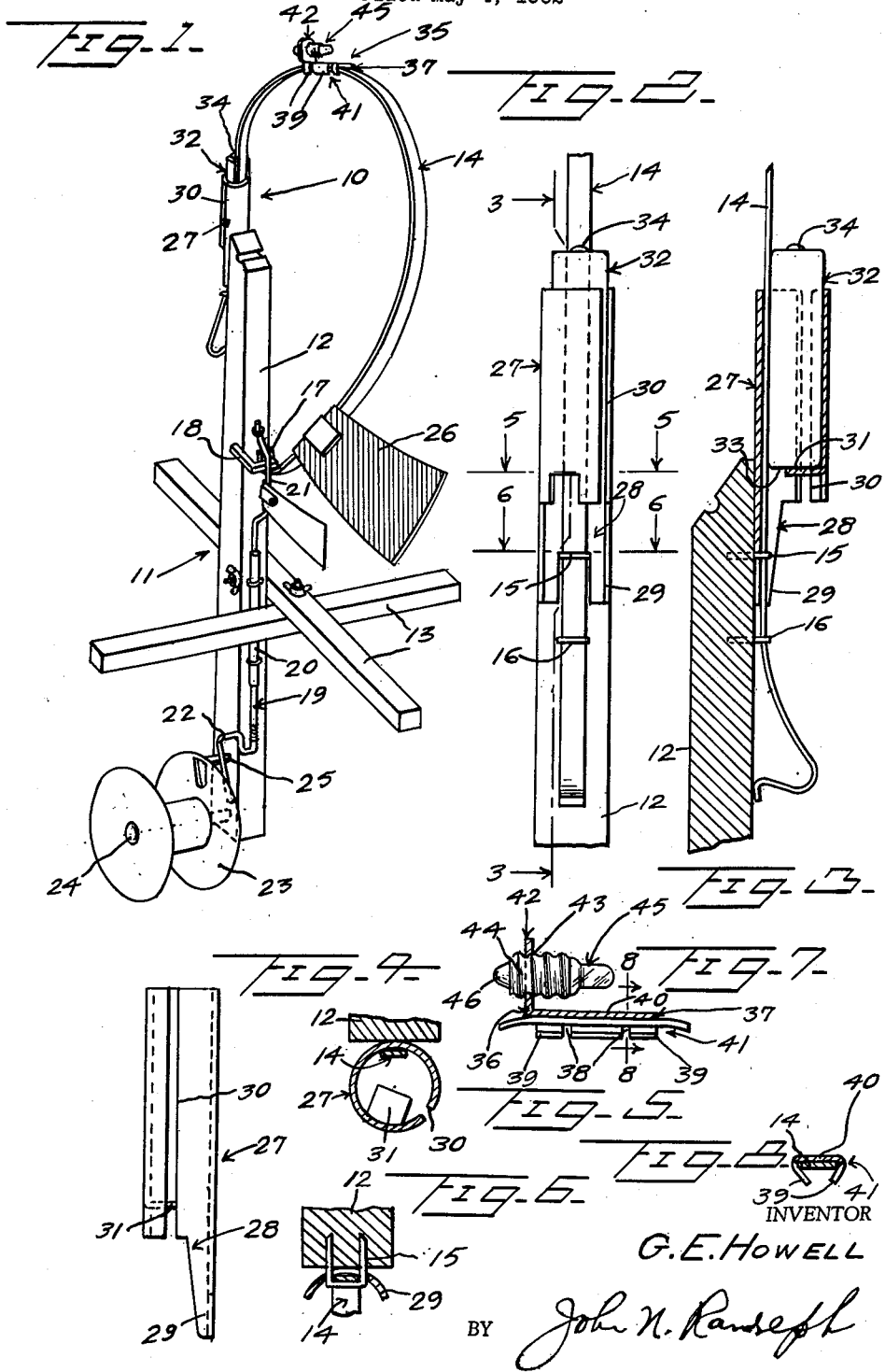

3,078,610
ILLUMINATED SIGNAL ATTACHMENT
FOR A FISHING RIG
George E. Howell, R.D. 2, Nicholson, Pa.
Filed May 4, 1962, Ser. No. 192,438
7 Claims. (Cl. 43—17)

This invention relates to an illuminated signal especially constructed to be applied to and utilized with a conventional fishing rig to provide an illuminated signal for visually indicating when a fish has been hooked.

More particularly, it is an aim of the invention to provide such an attachment for use on a fishing rig normally utilized for ice fishing and having a visual signal in the form of a flag which is released to assume an extended position above the rig to indicate that a fish has been caught, and which attachment enables the rig to be successfully used for night fishing, when the conventional flag signal will be invisible due to darkness.

More particularly, it is an object of the present invention to provide an illuminated signal attachment of extremely simple construction which may be very economically manufactured and sold and which may be quickly applied to or removed from a conventional fishing rig.

Still another object of the invention is to provide a signal attachment which requires no modification of the conventional fishing rig but which utilizes conventional parts thereof to render the attachment operative for accomplishing its intended result.

Various other objects and advantages of the invention will hereinafter become more fully apparent from the following description of the drawing, illustrating a presently preferred embodiment thereof, and wherein:

FIGURE 1 is a perspective view of a conventional fishing rig and showing the illuminated signal attachment, comprising the invention, applied thereto;

FIGURE 2 is an enlarged fragmentary side elevational view of part of the fishing rig and showing a part of the illuminated signal attachment mounted thereon;

FIGURE 3 is a longitudinal sectional view taken substantially along the line 3—3 of FIGURE 2;

FIGURE 4 is an elevational view of a part of the attachment;

FIGURES 5 and 6 are fragmentary cross sectional views taken substantially along planes as indicated by the lines 5—5 and 6—6, respectively, of FIGURE 2, and on enlarged scales;

FIGURE 7 is an enlarged fragmentary longitudinal sectional view illustrating another part of the signal attachment, and FIGURE 8 is a cross sectional view taken substantially along a plane as indicated by the line 8—8 of FIGURE 7.

Referring more specifically to the drawing, the signal attachment in its entirety and comprising the invention is designated generally 10 and is adapted for use on a conventional fishing rig, designated generally 11, and which is normally utilized for ice fishing. The fishing rig 11 corresponds to the fishing rig as disclosed by U.S. Patent No. 2,502,231 granted March 28, 1950. Said rig 11 includes a mast 12 which is connected to one of a pair of crossarms 13 which straddle a hole in the ice for supporting the mast 12 in substantially an upright position. The rig 11 includes an elongated resilient strip of metal 14 which is connected to a side of the upper part of the mast 12 by staples 15 and 16 and which has a hook shaped free end 17 which detachably engages a hook shaped detent element 18, which element 18 is secured to the mast below the staples 15 and 16 and on an opposite side thereof from said staples. A shaft 19 of the fishing rig is journaled in a bearing 20 which is secured to the mast 12 and has an upper crank 21 disposed to swing around the detent 18 and a lower crank 22 which can be positioned to extend laterally from the mast toward a reel 23. The reel 23 is journaled on a pin or shaft 24 which extends laterally from the lower portion of the mast 12, and a lug 25 projects from the inner side of the reel toward the mast. The crank 22 is disposed in the path of travel of the lug 25. Accordingly, when a pull is exerted on a fishing line, not shown, wound on the reel 23 for revolving said reel clockwise, as seen in FIGURE 1, the lug 25 will strike the crank 22 for turning the shaft 19 counterclockwise to swing the upper crank 21 across the detent 18 and into engagement with the hook 17 for moving said hook laterally of the mast 12 and out of engagement with the detent 18, so that the resilient signal element 14 can assume a straight upright position to provide a visual signal for daytime use to indicate that a fish has been caught. To enable the signal element 14 to be readily seen, during daylight hours, a flag 26 is attached to said element near the hook 17. The parts 12 to 26 are all conventional parts of the fishing rig as disclosed in Patent No. 2,502,231, and a further and more detailed description of the conventional fishing rig is considered unnecessary.

The illuminated signal attachment 10 comprises a barrel-shaped holder, designated generally 27, having at a lower end thereof an extension 28 the lower part of which is bifurcated, as seen at 29 in FIGURE 2. The holder 27 has a slot 30 extending from end-to-end thereof, which is circumferentially spaced from the extension 28, and a part of the holder, at its lower end and circumferentially spaced from the slot 30 and extension 28, is struck-out and bent upwardly and inwardly to form a stop 31.

It will be readily apparent that with the signal element 14 disengaged from the detent 18 and in an upright substantially straight position, that the holder 27 can be readily connected thereto by passing a part of the signal element 14 into said holder through the slot 30. The holder 27 is then slid downwardly toward the upper end of the mast 12 to wedge the extension 28 between the upper end of the mast 12 and an adjacent part of the resilient signal element 14, and with the bifurcated lower end 29 of said extension 28 straddling the upper staple 15, as seen in FIGURES 2 and 3, for non-turnably connecting the holder to the mast and signal element and with a part of the signal element 14 extending longitudinally through the holder and bearing against a part of the wall of said holder which is circumferentially spaced from the slot 30. The holder 27 is of a diameter to accommodate therein a conventional dry cell flashlight battery 32 which fits snugly therein and which is supported by its base contact 33 resting upon the abutment 31 and so that the positive contact 34 of the battery will be disposed above the upper end of the holder 27. It will also be apparent that the abutment 31 will make electrical contact with the contact 33 and that the remainder of the holder 27 will form an electrical connection from said battery contact 33 to the signal element 14.

The illuminated signal attachment 10 also includes a carrier 35 formed of electrical conducting material including a strip of metal 36 having an end portion 37 which is slit transversely from its side edges as seen at 38, to provide tongues 39 which are bent inwardly and toward one another to combine with the intermediate portion 40 of the end 37 to form a substantially straight sleeve member, designated generally 41, which slidably and non-rotatively embraces the signal element 14.

The other end 42 of the strip 36 is bent outwardly at a right angle from one end of the intermediate portion 40 and is provided with an opening 43 in which the threaded contact 44 of a light bulb 45 threadedly engages detachably and so that the other contact 46 of the light bulb will be disposed beyond the under or outer side of the part 42. It will also be noted that the part 42 is disposed on the same side of the signal element 14 as the battery 32 and at the end of the sleeve member 41 located nearest said battery and the holder 27.

The carrier 35 forms an electrical connection between the bulb contact 44 and the signal element 14. As seen in FIGURES 1 and 7, the carrier 35 is disposed so that its sleeve 41 will engage a part of the bowed portion of the signal element 14, when the signal element hook 17 is engaging the detent 18 for holding the signal element in loop form as seen in FIGURE 1. Thus, since the sleeve 41 is elongated and substantially straight, it will be in binding engagement with said bowed part of the strip 14 and will thus be frictionally held against movement relative to the strip 14, and at a point spaced from the holder 27 and battery 32, as seen in FIGURE 1. When the reel 23 is revolved by a strike to turn the shaft 19 for disengaging the hook 17 from the detent 18, as previously described, the resilient strip 14 will spring upwardly and assume a substantially straight position, releasing the carrier 35 from frictional engagement therewith and so that the carrier can slide by gravity down the strip 14 toward the holder 27 to carry the contact 46 into engagement with the battery contact 34, to thus complete an electric circuit from the battery through the light bulb 45, carrier 35, signal element 14 and holder 27 back to the battery contact 33, so that the bulb 45 will be energized to provide an illuminated signal which will be readily visible at night for indicating a strike, and when the signal flag 26 cannot be seen.

The signal element 14 in springing upwardly to its released upright position will vibrate to insure agitation of the carrier 35 so that it will readily slide down said element 14 and be guided thereby to bring the bulb contact 46 into engagement with the battery contact 34.

Various modifications and changes are contemplated and may be resorted to, without departing from the function or scope of the invention as hereinafter defined by the appended claims.

I claim as my invention:

1. In combination with a fishing rig including a substantially upright mast, a signal element comprising a normally straight elongated resilient strip of electrical conducting material of noncircular cross section secured at one end thereof to a side of the mast and extending upwardly therefrom, detent means carried by the mast and releasably engaging the other end of the strip to hold the strip distorted in loop form, and means engageable with the strip for releasing the strip from the detent means; an illuminated signal attachment comprising a holder detachably mounted on said signal element and releasably wedged between the first mentioned end of the strip and the mast, an electric current source detachably mounted in and supported by said holder, said holder including a part forming an electrical connection between a terminal of the current source and said signal element, an elongated substantially straight sleeve member slidably and non-turnably supported on said strip and immovably held by frictional engagement with a bowed portion thereof against sliding movement relative to the looped strip, a carrier supported by and projecting outwardly from a part of said sleeve member, and a light source supported by said carrier and positioned for movement with the carrier and sleeve member toward and into engagement with the other terminal of the current source when the signal element is released from said detent means and assumes a normal substantially straight position for releasing said sleeve member from binding engagement therewith, said sleeve member and carrier being formed of electrical conducting material for completing an electric circuit through the current source and light source.

2. In a combination as defined by claim 1 said holder comprising a barrel having a slot extending from end-to-end thereof for detachably engaging and disengaging the holder with the signal element.

3. In combination with a fiishing rig including an upright mast, an elongated normally substantially straight resilient signal element formed of electrical conducting material secured at one end thereof to a part of the mast and extending upwardly therefrom, detent means carried by the mast and releasably engaging the other end of the signal element and holding the signal element distorted in loop form and means engageable with the signal element for disengaging said element from the detent means; an illuminated signal attachment comprising a holder detachably mounted on the signal element and releasably clamped between said first end thereof and said part of the mast, an electrical current source demountably supported in said holder, said holder having a part forming an electrical connection between a terminal of the current source and said signal element, an elongated carrier slidably and nonrotatively supported on said signal element and frictionally held against movement relative thereto by engagement with a part of the bowed portion thereof, and a light source supported by said carrier, said carrier being gravity urged toward the holder when the signal element is disengaged from the detent means and assumes a substantially upright position for releasing the carrier from binding engagement therewith, said carrier being guided by the signal element for conveying the light source into electrical contact with the other terminal of the current source and forming an electrical connection between said signal element and said light source.

4. In a combination as defined by claim 3, said current source comprising a dry cell battery, and said light source comprising a light bulb having a threaded terminal threadedly engaging through and supported by a part of the carrier.

5. In a combination as defined by claim 4, said holder comprising a barrel shaped member having an inturned part engaging the base contact of the battery for supporting the battery in the holder and constituting the part electrically connecting the first mentioned battery terminal to the signal element.

6. In a combination as defined by claim 5, said holder having a lower end provided with a bifurcated extension partially straddling the first mentioned end of the signal element and including a part detachably wedged between said signal element end and the mast.

7. In combination with a fishing rig including an upright mast, an elongated normally substantially straight resilient signal element formed of electrical conducting material secured at one end thereof to a part of the mast and extending upwardly therefrom, detent means carried by the mast and releasably engaging the other end of the signal element and holding the signal element distorted in loop form, and means engageable with the signal element for disengaging said element from the detent means; an illuminated signal attachment comprising a holder mounted on the fishing rig adjacent said first mentioned end of the signal element, an electrical current source supported by said holder, said holder having a part forming an electrical connection between a terminal of the current source and said signal element, a carrier slidably supported on said signal element and frictionally held against movement relative thereto by engagement with a bowed portion thereof, and a light source supported by said carrier, said carrier being gravity urged toward the holder when the signal element is disengaged from the detent means and assumes a substantially upright position for releasing the carrier from binding engagement therewith, said carrier being guided by the signal element for conveying the light source into electrical contact with the other terminal of the current source and forming an electrical connection between said light source and signal element.

References Cited in the file of this patent

UNITED STATES PATENTS

| | | |
|---|---|---|
| 2,502,231 | Oberg | Mar. 28, 1950 |
| 2,785,493 | Thiel | Mar. 19, 1957 |
| 2,786,294 | Whitacre | Mar. 26, 1957 |
| 2,834,140 | Knier | May 13, 1958 |